July 8, 1958

J. B. DYER ET AL 2,841,994

WINDSHIELD WIPER MECHANISM

Filed April 6, 1953

INVENTORS
JOHN B. DYER
WALTER D. HARRISON
BY
George H. Strickland
THEIR ATTORNEY July 8, 1958   J. B. DYER ET AL   2,841,994
WINDSHIELD WIPER MECHANISM
Filed April 6, 1953   3 Sheets-Sheet 2
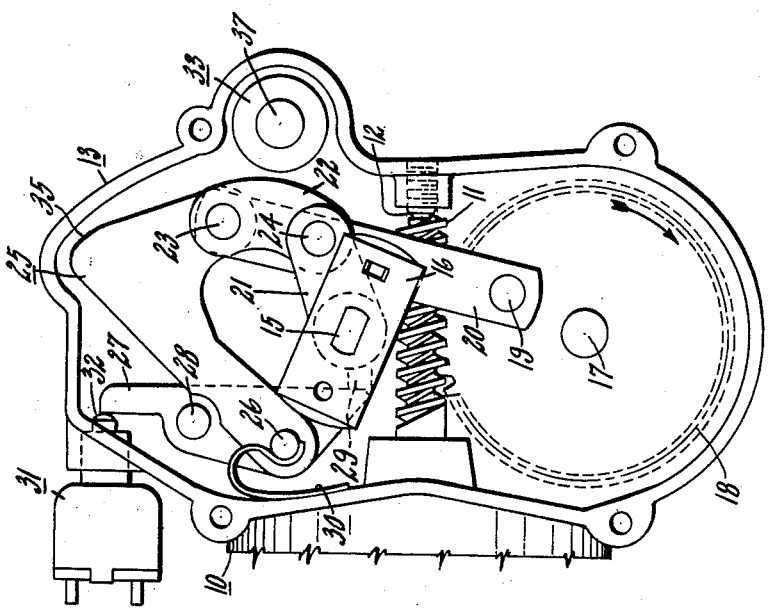
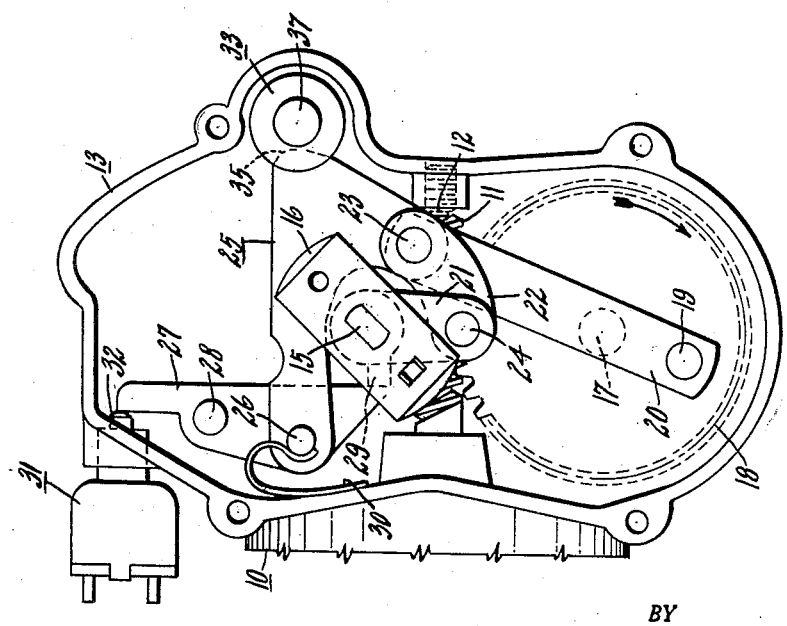
INVENTORS
JOHN B. DYER
WALTER D. HARRISON
BY
George H. Strickland
THEIR ATTORNEY July 8, 1958

J. B. DYER ET AL 2,841,994

WINDSHIELD WIPER MECHANISM

Filed April 6, 1953

INVENTORS
JOHN B. DYER
WALTER D. HARRISON

BY George H. Strickland
THEIR ATTORNEY

United States Patent Office 2,841,994
Patented July 8, 1958

2,841,994

WINDSHIELD WIPER MECHANISM

John B. Dyer, Syracuse, and Walter D. Harrison, Rochester, N. Y., assignors to General Motors Corporation, Detroit, Mich., a corporation of Delaware Application April 6, 1953, Serial No. 347,021

5 Claims. (Cl. 74—75)

The present invention pertains to mechanical movements and more particularly to a mechanical movement especially adapted for actuating windshield wipers.

Recent trends indicate that universal adoption of power driven windshield wipers appears inevitable if actuating mechanisms for power wipers become competitive with suction actuated mechanisms. Moreover, power driven wipers inherently have many advantages over a suction operated wiper such as: reliability of operation, and accurate speed control regardless of transitory changes in the operating conditions or speed of a motor vehicle engine. The problem has resolved itself to developing a production power driven wiper design which will perform all the desirable functions of the suction operated wiper, and yet be competitive from a cost standpoint. Accordingly, among our objects are the provision of a mechanical movement adapted for actuating windshield wipers; the provision of simplified control means for operating the actuating mechanism of power driven windshield wipers; and the further provision of means for parking wiper blades out of the normal range of vision.

The aforementioned and other objects are accomplished in the present invention by employing a mechanical movement in which the effective operating length of a connecting rod or pitman arm can be varied at will by the operator. Specifically, the mechanical movement includes a compound linkage arrangement operatively connected to and driven by a connecting rod which is pivotally connected by means of a crank pin to a unidirectional rotatable member. In this instance the rotatable member takes the form of a worm gear that is driven through a worm by a unidirectional D. C. motor, as the rotary power means. However, it is to be understood that the mechanism of this invention could be modified so as to be driven by a rotary power means other than an electric motor and the illustrated embodiment disclosing an electric motor is only by way of example and not by way of limitation.

The compound linkage includes, as illustrated, an arcuate link pivotally interconnecting one end of the connecting rod and one end of a lever attached to a wiper actuating shaft. A second link, having a configuration similar to that of a bell crank, has one end pivotally connected at the point of pivotal connection between the arcuate link and the connecting rod, the other end of the second link having movable pivot connection for a reason which will appear hereinafter. The movable pivot connection of the second link is carried by a lever pivotally mounted in a housing in which the motion converting means or mechanical movement mechanism is disposed. One end of the housing mounted lever, which is movable about its pivot point between predetermined limit positions within the housing, is operatively associated with and adapted to actuate a parking switch for the electric motor. The movable pivot point of the bell crank shaped link, and hence the housing mounted lever, are normally spring biased to engage a housing stop such that the parking switch is maintained in the closed position.

One of the more desirable attributes of suction operated wiper mechanisms is that of parking the wiper blades out of the normal range of vision when the actuating mechanism is not in operation. This invention also contemplates the provision of means for parking the wiper blades out of the normal range of vision upon cessation of wiper operation by the manipulation of a single control element. In particular an axially movable roller is disposed within the aforementioned housing, the roller being normally spring biased to an inoperative position. The roller can be moved to an operative position through a Bowden wire adjustment in which position the roller cooperates with the bell crank shaped link so that upon oscillatory movement of the latter link by the connecting rod, the movable pivot point of this link will be shifted a predetermined distance within the housing so as to increase the effective operating length of the connecting rod to thereby increase the amplitude of oscillatory movement transmitted to the wiper actuating shaft. By increasing the oscillatory arc of the wiper actuating shaft, the wiper blades are moved out of the normal wiping range and into a parked position, preferably to a position where they are in contiguous relation to the windshield cowl structure. Concurrently with the displacement of the movable pivot point of the bell crank shaped link, the housing mounted lever swings about its pivotal connection and opens the parking switch so that the electric motor will be deenergized, the motor having sufficient inertia, after deenergization, to continue movement of the wiper blades to the parked position before rotation thereof ceases.

Further objects and advantages of the present invention will be apparent from the following description, reference being had to the accompanying drawings wherein a preferred embodiment of the present invention is clearly shown.

In the drawings:

Fig. 2 is a fragmentary view in elevation, with the cover removed, illustrating component parts of the mechanical movement in one of its positions.

Fig. 3 is a view similar to Fig. 2 showing the several parts of the mechanical movement in a different operating position.

Figure 1:
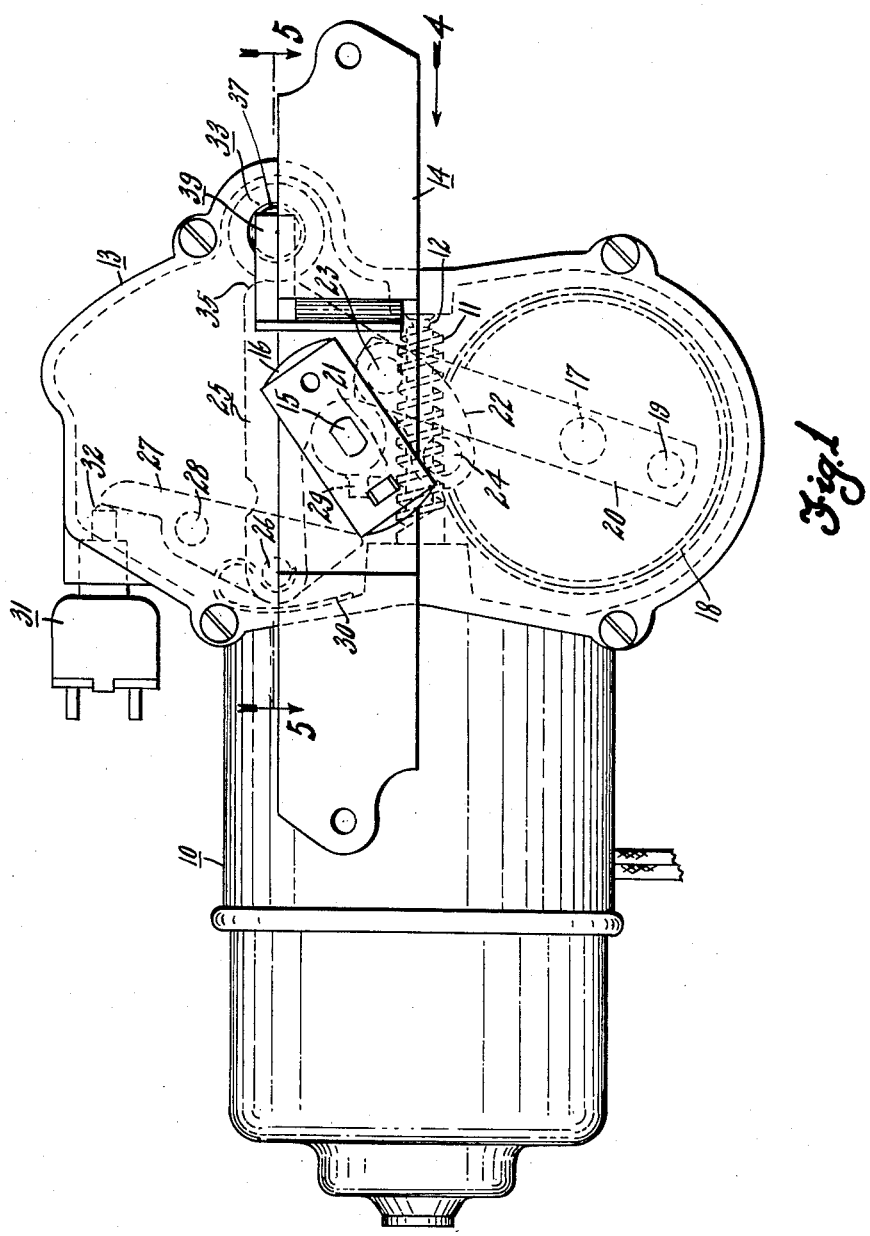
Fig. 1 is a side view in elevation of a windshield wiper actuating mechanism constructed according to this invention.

With particular reference to Fig. 1 the windshield wiper actuating mechanism is depicted as driven by a unidirectional D. C. electric motor 10, the armature shaft of which extends through an opening in the motor housing and is formed to constitute a worm 11 having a support 12, permitting end play adjustment, at its free end. The support 12 is carried by a side wall of a housing 13 which encloses motion converting means, or mechanical movement mechanism, to be described. Suffice it here to say that the housing 13 is integral with and forms an end cap for the electric motor 10, the entire assembly having attached thereto a bracket 14 by which it may be secured to the fire wall of a motor vehicle such that a wiper actuating shaft 15 with a coupling member 16, are disposed for operative connection to cable driving means located on the passenger compartment side of the fire wall. Suitable cable transmission, as is well known in the art, may be attached to the member 16 and extend underneath the instrument panel of a motor vehicle for transmitting oscillatory movement of the member 16 to windshield wiper blades adapted for movement over the surface of a windshield in a conventional manner, none of the aforegoing being shown.

Referring more particularly to Figs. 2 and 3, the mechanical movement mechanism will next be described. Rotatably supported within the housing by means of a shaft 17, is a worm gear or wheel 18 having operative engagement with the motor driven worm 11. The worm gear 18 carries a bearing 19 eccentrically disposed with respect to the axis of rotation of the gear 18, the bearing 19 constituting a crank pin. A connecting rod or pitman arm 20 has one end thereof pivotally connected with the crank pin 19, in consequence of which the connecting rod will be continuously operated upon rotation of the worm gear. The other end of the connecting rod extends adjacent to the oscillatable wiper actuating shaft 15.

The wiper actuating shaft 15 has attached thereto within the housing 13, an oscillatable arm or lever 21, which extends substantially radially therefrom. The ends of the lever 21 and the connecting rod 20 are interconnected by an arcuate operating link 22, the link 22 having pivotal connection with the connecting rod at 23, and pivotal connection with the lever 21 at 24. Although the link 22 is illustrated as being of arcuate configuration, it is readily apparent that the link need not necessarily be so constructed. The mechanical movement thus far described constitutes a compound linkage arrangement for converting rotary motion of the worm gear 18 into fixed magnitude oscillatory motion of the actuating shaft 15. Thus, if the gear 18 is rotated by the worm 11, the wiper blades, not shown, which are operatively connected to the member 16, will be moved in arcuate paths across the surface of a motor vehicle windshield, not shown.

In order to increase the amplitude of oscillatory movement transmitted to the actuating shaft 15 by the compound linkage aforedescribed, means are provided for increasing the effective operating lengths of the connecting rod 20. These means include a bell crank shaped link 25, one end of which is pivotally connected at 23, which is the point of pivotal connection between link 22 and the connecting rod 20. The other end of the link 25 is carried by a pivot 26, which may be displaced within the housing 13 to increase the effective operating length of the connecting rod 20 by altering the angular relationship between the connecting rod and a line intersecting the axes of the driving and driven members, 18 and 15. Thus, it may be said that the link 25 has a movable pivot point connection at one end thereof. The pivot 26 is carried by a lever 27 pivotally connected intermediate its ends at 28 to the housing 13. The housing mounted lever 27 is permitted to swing about its pivot point 28 within predetermined limit positions. One end of the lever 27 cooperates with, and is formed to abut a stop 29 formed on a portion of the housing 13 to thereby limit counterclockwise movement of the lever 27 about its pivot point 28 as viewed in Figs. 2 and 3. Clockwise movement of the lever 27 about its pivot point 28 is limited by a portion of the lever 27 abutting an inner wall of the housing 13 as is shown in Fig. 1. The lever 27 is normally biased into engagement with stop 29 by means of a substantially U-shaped leaf spring 30, one end of which is suitably attached to the housing 13, and the other end of which acts on pivot 26, as is shown in Figs. 2 and 3.

The end of the lever 27 remote from the stop 29 is operatively associated with and adapted to actuate a plunger type switch 31 carried by the housing 13. The structural details of the switch 31 are not disclosed, as any conventional plunger actuated, spring biased switch may be employed. Suffice it to say that the switch contacts are opened and closed by movement of a plunger 32 which extends into the housing 13 and abuts the end of lever 27. In the position the plunger 32 is shown in Figs. 2 and 3 the switch contacts of the parking switch 31 are closed, while in Fig. 1 the switch contacts are open.

Figure 4:
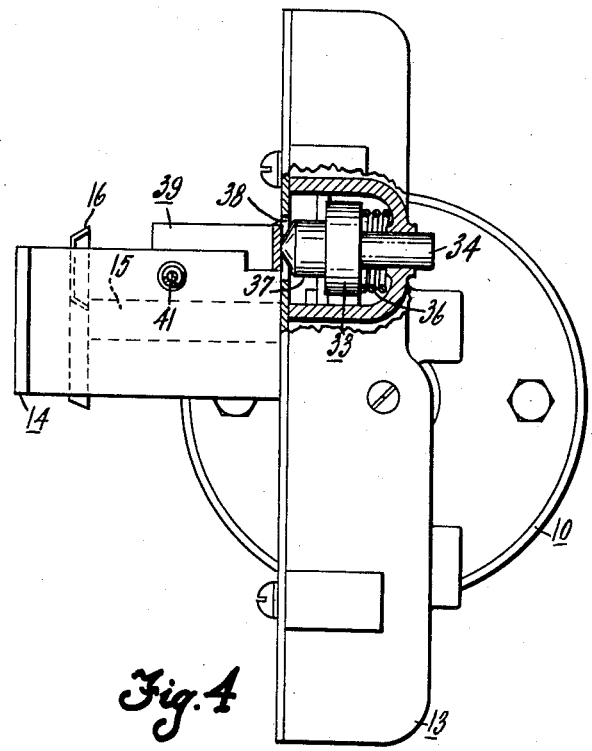
Fig. 4 is an end view, partly in elevation and partly in section, of the windshield wiper actuating mechanism of Fig. 1.
Figure 5:
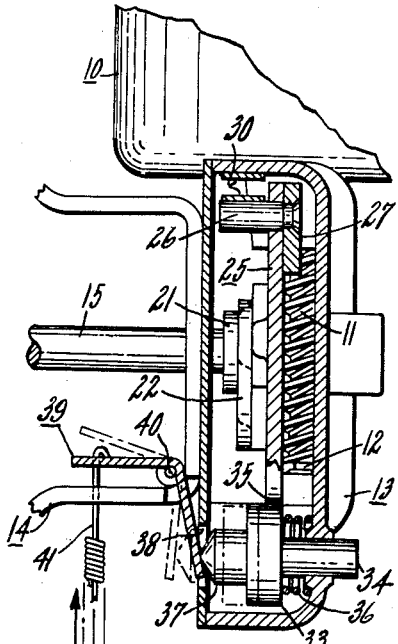
Fig. 5 is a sectional view taken along line 5—5 of Fig. 1.

In order to simplify the control means for the wiper actuating mechanism, the present invention contemplates employing the motor 10 as the means for displacing the pivot point 26 of the bell crank shaped link 25. Thus, with particular reference to Figs. 2 through 5 it will be seen that the housing 13 carries an axially movable roller 33 by means of a stub shaft 34, which projects through and is supported by the housing. The roller 33 is adapted to cooperate with the cam surface 35 of the bell crank shaped link 25. The roller 33 in its full line position of Figs. 4 and 5 is in its operative position. That is, when the roller is in its operative position, it is moved axially into alignment with the bell crank shaped link 25 such that upon rotation of the worm gear 18 in the clockwise direction of the arrows appearing in Figs. 2 and 3 and, from the position of the connecting rod in Fig. 3 to the position thereof in Fig. 2, the roller 33 will come into engagement with the cam surface 35 of the link 25 so as to move the pivot point 26 from the position it is shown in Fig. 2 to the position it is shown in Fig. 1. The pivot point 26 in moving between the positions it is shown in Fig. 2 and Fig. 1 increases the effective operating length of the connecting rod 20 so as to increase the amplitude of oscillatory movement transmitted to the actuating shaft 15. In the present invention it is contemplated that the effective operating length of the connecting rod will be increased to such an extent that the oscillatory arc of the actuating shaft 15 will be moved throughout an angle of between 10° and 15° to one side of its normal range of movement. Thus, in comparing Figs. 1 and 2, it will be seen that the actuating shaft 15 is displaced 10° to 15° in a clockwise direction when the movable pivot point 26 is in the position of Fig. 1.

The roller 33 is normally maintained in an inoperative position by means of a compression spring 36, having ends seated against one face of the roller and inner surface of the housing 13, respectively. The inoperative position of roller is depicted by the dotted lines in Fig. 5, and the full lines in Figs. 2 and 3. In its inoperative position, the roller 33 is not in alignment with the bell crank shaped link 25, and accordingly during rotation of the worm gear 18 the pivot point 26 will remain in the position shown in Figs. 2 and 3. This will result in transmitting oscillatory motion to the actuating shaft 15 of predetermined amplitude such as to cause the wiper blades, not shown, to move across the wiping zone of a windshield, not shown. It should be noted that the roller has projecting from one end thereof an abutment 37 which, when the roller 33 is in its inoperative position, extends through an opening 38 in one wall of the housing 13. Movement of the roller 33 to its operative position is affected by a lever 39 having arms diverging substantially normal to each other, and an intermediate point hinged at 40 to the bracket 14. One arm of the hinge 39 is disposed for engagement with the end of abutment 37, and as illustrated in the dotted line position of Fig. 5, limits movement of the roller 33 under the urge of spring 36. The other arm of the lever 39 has connected thereto one end of a Bowden wire 41 which passes through a suitable aperture in the bracket 14 and may be moved axially a limited distance by means to be described hereinafter. Suffice it here to say that axial movement of the Bowden wire 41 in the direction of the arrow in Fig. 5 will move the lever 39 to its dotted line position of this figure thereby enabling the spring 36 to move the roller 33 to its inoperative position. Conversely, if the Bowden wire is moved axially in a direction opposite to that of arrow in Fig. 5, the lever 39 will be moved to its full line position in this figure thereby moving the roller 33 to its inoperative position.

Figure 6:
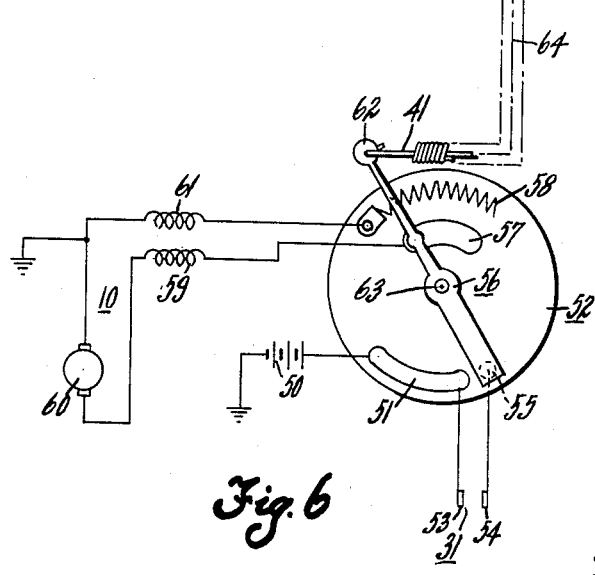
Fig. 6 is a schematic diagram of the electrical circuit and switch means for controlling the wiper mechanism.

With particular reference to Fig. 6, the circuit arrangement for energizing the motor 10 will be described. The circuit includes a battery 50, one terminal of which is connected to ground and the other terminal of which is connected by a wire to a bus bar 51, forming part of a switch assembly designated generally by 52. The bus bar 51 has electrically connected thereto a contact 53 which is adapted to cooperate with a contact 54 electrically connected to a terminal 55 of the switch assembly 52. The contacts 53 and 54 constitute the parking switch 31, heretofore referred to. The switch assembly 52 includes a rotary contact or bridging member 56, which may be actuated by a suitable knob accessible to the motor vehicle operator, not shown. The switch assembly 52 also includes a second bus bar 57 and a variable resistor 58. The bus bar 57 is connected by a wire through the series field coil 59 of the electric motor 10 to one side of the armature 60 thereof, the other side of the armature being connected to ground. One terminal of the resistor 58 is connected by a wire to the shunt field coil 61 of the electric motor 10, the other end of the shunt field coil being connected to ground.

The rotary contact member 56 is also provided with an end portion 62 that is adapted to transmit substantially axial movement to the Bowden wire 41 during rotative movement of the member 56 about its pivot connection 63. For the present it will suffice to say that as the contact member 56 is moved in a clockwise direction as viewed in Fig. 6, the motor 10 will be energized as soon as the member 56 engages bus bar 51 and the speed thereof will be determined by the amount of the resistance 58 which is introduced in series with the shunt field coil 61, as is well known in the art. The Bowden cable connection between the end 62 of the contact member 56 and the hinge 39 is illustrated by dot and dash line 64, the connection being of such that the hinge is not moved to the full line position of Fig. 5 until the contact member 56 is moved into engagement with terminal 55.

*Operation*

Assuming the wiper blades to be in the parked position against the cowl of a windshield, not shown, a complete cycle of wiper operations will be described. When the operator moves the contact member 56 in a clockwise direction so that the member bridges bus bars 51 and 57 of the switch assembly 52, and also inserts a predetermined portion of variable resistor 58 in series with the shunt field 61, such movement of the contact member 56 will be sufficient to displace the hinge member 39 through Bowden wire 41 to the dotted line position it is shown in Fig. 5, thus enabling the spring 36 to move the roller 33 to an inoperative position. Accordingly, upon rotation of the worm gear 18 by the motor 10 through the worm 11, oscillatory movement of fixed amplitude will be transmitted by the mechanical movement, aforedescribed, from the connecting rod 20 to the actuating shaft 15. It is to be noted that as soon as the roller 33 is axially moved to an inoperative position, the spring 30 will move the pivot point 26 of the link 25 and consequently the lever 27 in a counterclockwise direction about pivot 28 in the position shown in Fig. 2. Thus, the effective length of the connecting rod 20 will be reduced to its minimum value and the actuating shaft 15 will be moved throughout its minimum oscillatory arc. An infinite number of speed settings are possible by employing the resistor 58, any portion of which may be connected in series with the shunt field winding 61. Thus, to change the speed of wiper movement the operator need only manipulate a knob, not shown, so as to move the contact member 56 in either a clockwise or counterclockwise direction as long as the contact member 56 engages bus bar 51. This, it should be noted, requires an effort on the part of the operator which may be termed de minimus.

When the operator desires to stop wiper operation and park the wiper blades, he need only manipulate the control knob, not shown, so as to move the contact member 56 of the switch assembly 52 to the position shown in Fig. 6. When the contact member 56 is moved to the position of Fig. 6 and into engagement with terminal 55, the motor 10 will continue to be energized for low speed operation, as the plunger 32 maintains contacts 53 and 54 of the automatic or parking switch closed when the lever 27 is in the position shown in Figs. 2 and 3. However, movement of the contact member 56 to the position of Fig. 6 also affects axial movement of the Bowden wire 41 causing movement of the hinge 39 to the full line position of Fig. 5. Movement of the hinge 39 to the full line position affects axial movement of the roller 33 to its operative position, and accordingly during the next ensuing movement of link 25 from the position shown in Fig. 3 to the position shown in Fig. 2, roller 33 will contact cam face 35 thereof thereby displacing the movable pivot point 26 of the link so as to increase the effective operating length, or throw, of the connecting rod 20. The effort on the part of the operator in moving the Bowden wire 41 so as to displace the roller 33 axially again may be termed de minimus.

If the pivot point 26 of the link 25 is displaced from the position in Fig. 2 to the position in Fig. 1, the lever 27 moves in a clockwise direction about its pivot point 28, and the end thereof in engagement with the plunger 32 of the automatic or parking switch 31 will affect separation of contacts 53 and 54 shown in Fig. 6. Separation of contacts 53 and 54 will deenergize the motor 10, the motor having sufficient inertia to move the worm gear 18 throughout a sufficient angular distance after the mechanical movement is adjusted to increase the amplitude of oscillatory movement of the actuating shaft 15 to a maximum at one end of its normal range, so as to move the wiper blades, not shown, into a parked position against the cowl of a motor vehicle, not shown.

It is to be noted that parking of the wiper blades, not shown, by increasing the amplitude of oscillatory movement is affected while the connecting rod moves through a dead center position, and accordingly a slight over travel due to motor inertia will not displace the blades from their parked position. It should further be noted that by employing a worm for driving the worm gear, a tremendous gear reduction is effected, such that the motor may revolve many times without appreciably altering the position of the worm gear 18.

From the foregoing it is apparent that the present invention provides power driven windshield wiper actuating mechanism which is of extremely simplified design and construction. Moreover the mechanism will be extremely reliable in operation and will be economical to manufacture.

While the embodiment of the present invention as herein disclosed, constitutes a preferred form, it is to be understood that other forms might be adopted.

What is claimed is as follows:

1. Windshield wiper actuating mechanism including in combination, a unidirectional rotatable driving member, an oscillatable driven member, a connecting rod having pivotal connection at one end to said driving member, a link pivotally connected to the other end of said connecting rod, a second link pivotally connected to the other end of said connecting rod, and means operatively interconnecting said link and said driven member, the construction and arrangement being such that rotation of said driving member imparts oscillation to said driven member, and manually positionable means engageable with said second link due to rotation of the driving member operable to vary the amplitude of oscillation imparted to said driven member.

2. Windshield wiper actuating mechanism including in combination, a rotatable driving member, an oscilatable driven member, a connecting rod having one end pivotally connected to said driving member at a point displaced from the axis thereof, a link having one end pivotally connected to the other end of said connecting rod, an arm connected to said driven member and extending therefrom, the free end of said arm and the other end of said link being pivotally interconnected, an adjusting link having one end pivotally connected to said connecting rod and a movable pivot point at the other end, and manually positionable means engageable with said adjusting link due to rotation of said driving member operable to displace the movable pivot point of said adjusting link and vary the extent of movement produced by said connecting rod so as to vary the amplitude of oscillation imparted to said driven member.

3. Windshield wiper actuating mechanism including in combination, a rotatable driving member, an oscillatable driven member, a connecting rod having one end pivotally connected to said driving member, means operatively interconnecting the other end of said connecting rod and said driven member constructed and arranged to impart rotation to said driven member upon movement of said connecting rod effected by rotation of said driving member, said interconnecting means including a link having one end pivotally connected to said connecting rod, a movable pivot point for the other end of said link, and manually positionable means operable due to rotation of said driving member and engageable with said link for displacing the movable pivot point of the said link so as to vary the amplitude of oscillation imparted to said driven member.

4. Windshield wiper actuating mechanism including in combination, a rotatable driving member, an oscillatable driven member, means interconnecting said members constructed and arranged to impart oscillation to said driven member upon rotation of said driving member, said interconnecting means including a link having one end pivotally connected with another part of said interconnecting means, a movable pivot point for the remaining end of said link, and manually positionable means operable due to rotation of said driving member and engageable with said link for displacing said pivot point so as to vary the amplitude of oscillation imparted to said driven member.

5. Windshield wiper actuating mechanism including in combination, a unidirectional rotatable driving member, an oscillatable driven member, means interconnecting said members constructed and arranged to impart oscillation to said driven member upon rotation of said driving member, said interconnecting means including a link having one end pivotally connected to another part of said interconnecting means, a lever having a fixed pivot, a movable pivot point for the other end of said link, said pivot point being carried by said lever, means operatively associated with one end of said lever for discontinuing the application of torque to said driving member, and means operatively associated with said link for displacing the movable pivot point of said link so as to effect pivotal movement of said lever and thereby discontinue torque application to said driving member at a predetermined position of said driven member.

References Cited in the file of this patent

UNITED STATES PATENTS

| 1,720,906 | Knudsen | July 16, 1929 |
| 2,079,573 | Lauer | May 4, 1937 |
| 2,137,628 | Sayre | Nov. 22, 1938 |
| 2,403,233 | Patch | July 26, 1946 |
| 2,452,496 | Schnieder | Oct. 26, 1948 |
| 2,491,697 | Vischulis | Dec. 20, 1949 |
| 2,513,247 | Morton | June 27, 1950 |
| 2,538,432 | Sivacek | Jan. 16, 1951 |

FOREIGN PATENTS

| 461,255 | Great Britain | Feb. 15, 1937 |
| 515,965 | Great Britain | June 6, 1939 |